Figure 1:
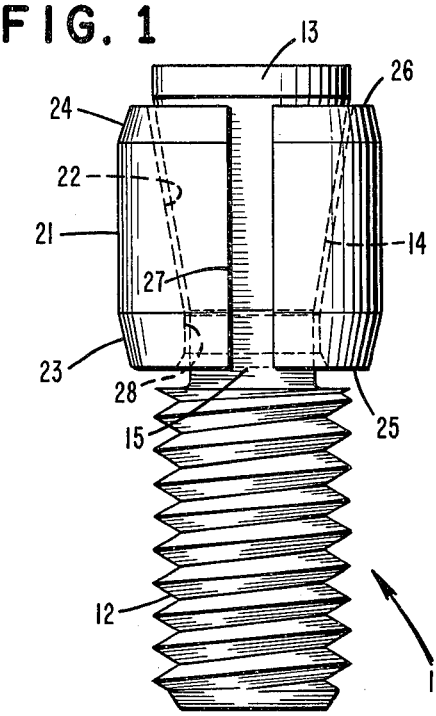

United States Patent [19]

Singh

[11] 3,925,868
[45] Dec. 16, 1975

[54] CLAMPING ASSEMBLY FOR CUTTER BITS
[75] Inventor: Kanwar J. Singh, Meadville, Pa.
[73] Assignee: McCrosky Tool Corporation, Meadville, Pa.
[22] Filed: June 21, 1974
[21] Appl. No.: 481,781

[52] U.S. Cl. .................................................. 29/96
[51] Int. Cl.² ........................................... B26D 1/00
[58] Field of Search ......................................... 29/96

[56] References Cited
UNITED STATES PATENTS

| | | | |
|---|---|---|---|
| 3,320,654 | 5/1967 | Lovendahl | 29/96 |
| 3,526,025 | 9/1970 | Sletten | 29/96 X |
| 3,648,341 | 3/1972 | Viellet | 29/96 |

*Primary Examiner*—Leonidas Vlachos
*Attorney, Agent, or Firm*—Samuel Lebowitz

[57] ABSTRACT

A clamping assembly for an apertured indexable cutter bit within a recessed seat therefor on a tool holder, comprised of a fastening bolt having a threaded portion at its inner end and a tapered head at its outer end. A resilient split collet or sleeve, of a height comparable to the height of the cutter bit and of increasing thickness from the outer end to the inner end thereof, surrounds the tapered head and fits closely within the space between the tapered head of the bolt and the aperture in the cutting bit. The rotation of the fastening bolt and its advance into a threaded opening in the tool holder, effects a spreading of the resilient collet so that the outer lateral surface of the collet grasps tightly the cutter bit and fixes it within the seat of the tool holder for all cutting operations. No parts of the clamping components project beyond the contours of the tool assembly to cause any interference with the chip flow. Furthermore, the clamping action may be released easily by rotation of the fastening bolt in the reverse direction which causes the resilient split collet to release the cutting tool from the tool holder for indexing or removal. Since none of the parts undergo any permanent distortion, the newly positioned cutter bit may be fixed quickly in its new position by again advancing the fastening bolt into the threaded opening in the tool holder.

8 Claims, 3 Drawing Figures

U.S. Patent  Dec. 16, 1975  3,925,868

CLAMPING ASSEMBLY FOR CUTTER BITS

This invention relates to the mounting of indexable cutting bits or inserts on a tool holder for the purpose of integrating the two units for the performance of machine cutting operations.

It is the object of the present invention to provide a rugged and reliable tool clamping assembly for interconnecting detachable cutter blades or inserts with tool holders of all types so that the cutter bits may effect heavy cutting operations without engendering faulty cuts in consequence of machine vibrations or loosening of the cutter bits in the tool assembly.

It is another object of the invention to provide a simplified tool clamping assembly of few parts, for fastening indexable cutting bits on a tool holder, which assures a rigid interconnection between the component parts during the cutting operations while permitting the ready disengagement of the cutting bits from the tool holder when the removal of the cutting bits from the latter is desirable for interchanging the cutter bits in their entirety or interchanging the positioning of the cutter edges thereof.

The use of interchangeable cutter bits on tool holders in mill cutting operations of all types is well known in the art for the purpose of attaining economies in the utilization of cutting tools and the machining operations performed therewith. The instant invention seeks to improve upon known expedients for clamping the cutting inserts in tool holders while maintaining ideal conditions of chip flow in heavy machining operations which compare favorably with integral tool holders and cutting operations which are costly to produce and to maintain.

It is an object of the present invention to improve tool holder arrangements of the type disclosed in the patents of the prior art, of which U.S. Pat. Nos. 3,320,654, May 23, 1967, and 3,747,179, July 24, 1973, are illustrative.

The invention attains a stable and powerful support for an indexable apertured cutting bit within a recessed seat therefor in the body of the tool holder, by the utilization of a resilient collet of substantial depth and thickness which surrounds the tapered head of a fastening bolt substantially in its entirety. The collet or sleeve is provided with a substantially cylindrical external wall which is insertable within the central bore or aperture of the cutting bit and a frustoconical internal wall surrounding the head of the bolt. The resilient collet is expanded by the cooperative action between the tapered wall of the interior thereof and the tapered head of the bolt, so that as the latter is advanced into the body of the tool holder by the cooperative action of screw threads on the interior of the holder and the threaded shank of the bolt, a rigid clamping action is effected between the tool holder and the cutter bit through the intermediary of the clamping bolt and the resilient split collet which produces a substantially complete bearing of the cutter bit against the tool holder, including the base and upstanding shoulders of the seat formed in the tool holder adjacent to the threaded bore therein.

Figure 3:
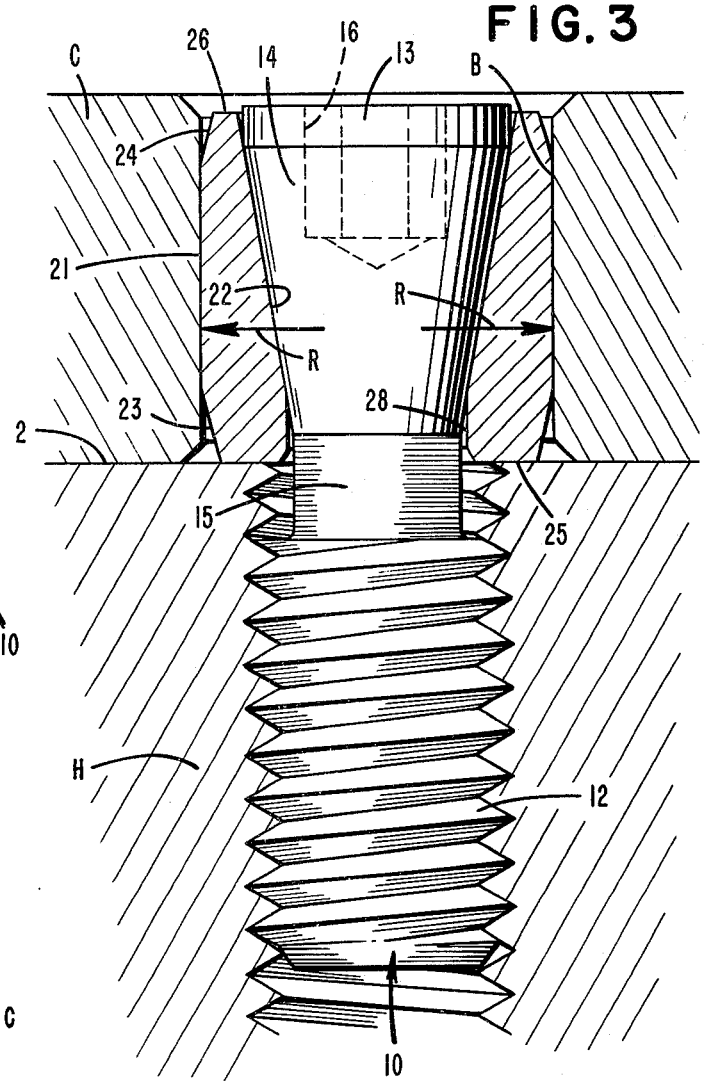
Figure 2:
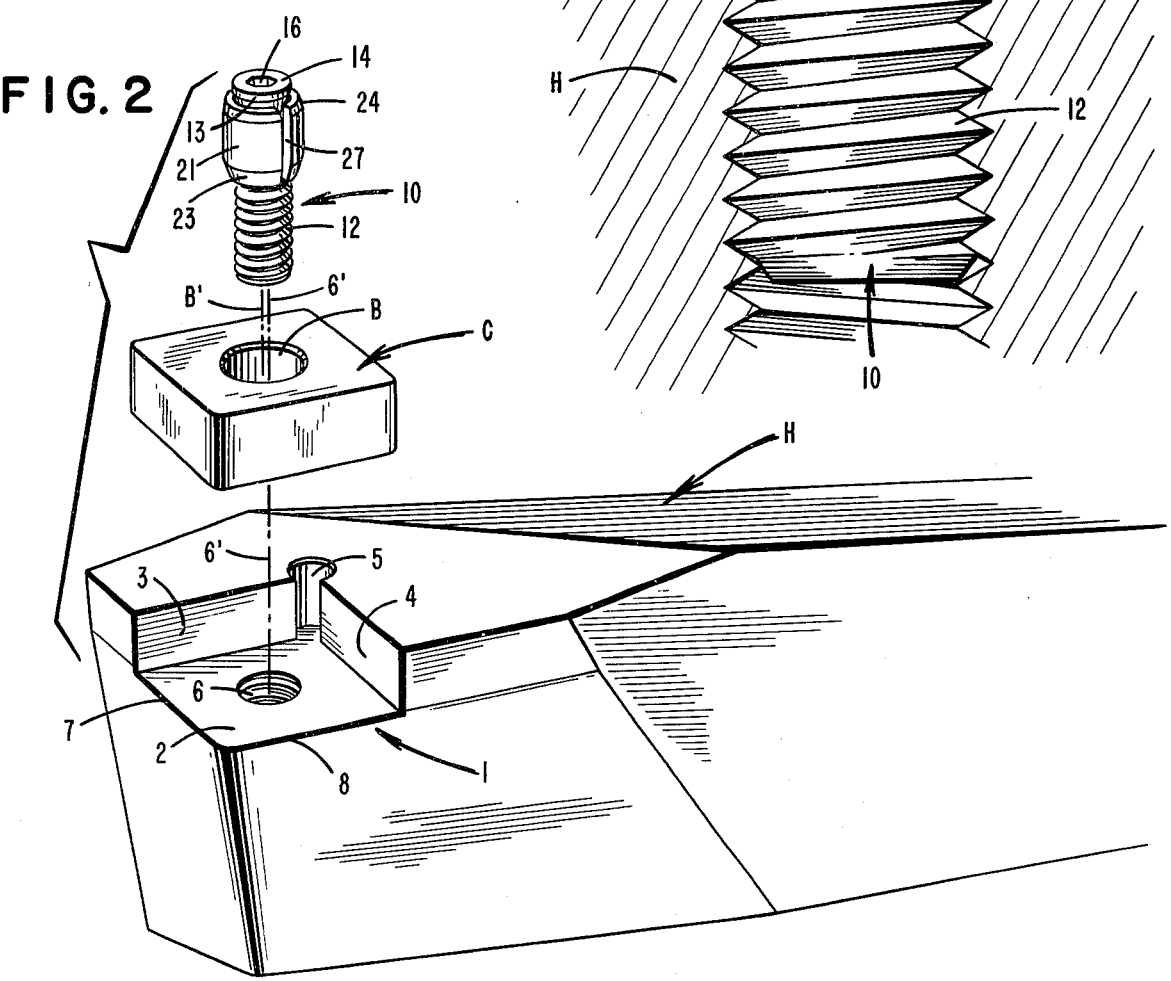

Other objects and purposes will appear from the detailed description of the invention following hereinafter, taken in conjunction with the accompanying drawings, wherein FIG. 1 is a front elevation of the combined clamping bolt and resilient collet surrounding the upper portion thereof which is designed to cooperate with a polygonally-shaped apertured cutter bit having a central cylindrical bore;

FIG. 2 is an expanded view showing the cooperative action between the combined clamping bolt and resilient collet, preparatory to its insertion through a cutting bit which is adapted to be positioned within a seat on the forward end of a lathe tool holder; and FIG. 3 is a sectional view showing the position of the parts following the advance of the fastening bolt into the tool holder.

In the drawings is illustrated the mounting of a rectangular cutting bit or insert, provided with multiple cutting edges which may be indexed in several cutting positions on a tool holder H which, for the purpose of simplicity, is illustrated as a lathe tool. The invention is applicable to any other type of tool holder, including rotary milling cutters of all types, reamers, boring bars and tools, etc.

The tool holder is formed with a seat 1 for the cutter bit C by forming the base 2 and shoulders 3 and 4 extending upwardly therefrom for accommodating the cutter bit C in its several interchangeable positions. An opening 5 is drilled in the upper face of the tool holder to provide a gap between the shoulders 3 and 4 for accommodating the corner of the cutter bit which is remote from the cutting edges which are positioned adjacent to the free edges 7 and 8 of the seat. Of course, the cutting edges of the cutter bit C may be sharpened at any desired rake angles, in dependence upon the machining operations which are to be executed.

The tool holder is drilled with a cylindrical opening 6 in the base thereof which is suitably threaded to receive the correspondingly threaded shank 12 of the fastening bolt 10 with no clearance. The fastening bolt is formed with a tapered head 14 of substantial depth at the end thereof remote from the threaded shank, and the head is spaced from the shank by a short cylindrical portion 15. The tapered head 14 is of approximately the same depth as the cutting bit and the free end of the head 13 may be of cylindrical outline having a lateral wall joined with a planar top in which is recessed an opening 16 for accommodating the head of an Allen socket wrench.

A split sleeve or collet, of rugged construction, surrounds the head of the upper portion of the clamping bolt and is formed with a substantially cylindrical external lateral surface 21 which terminates in inwardly tapered frusto-conical surfaces 23 and 24 at the lower and upper ends 25 and 26 of the collet. These serve to facilitate the guiding and clamping of the split collet within the cylindrical bore at the center of the cutter bit C.

The inner wall 22 of the collet is formed as a frustoconical surface for the major part of its length, with a conicity corresponding to that of the lateral surface 14 of the head of the bolt so that rectilinear movement of the bolt in an axial direction results in a radial spreading movement of the split collet, which is permitted by the relatively narrow split 27 extending through the entire length of the collet. This radial spreading and contracting capability is indicated by arrows R in FIG. 3. Thus, as shown in FIG. 3, following the seating of the cutter bit C within recess 1, the combined clamping bolt and split collet is inserted within the bore B, and upon turning of the bolt 10, the tapered head of the latter is advanced relative to the fixedly positioned collet on the base 2 of the recess in the tool holder, so that the expansion of the collet results in a substantially full bearing between the lateral surface of the collet and the bore of the cutter bit. Because the inner surfaces of the collet, as well as the advancing bolt, are below the top surface of the cutter bit, there are no protrusions which impede the chip flow, and there are no projections which may cause any accidents.

Desirably, the axis of the opening 6 in the body of the tool holder is parallel to and displaced outwardly from the axis of the bore B, a few thousandths of an inch relative to the relief opening 5, so that as the clamping bolt is advanced into the interior of the tool holder, the tendency arises to impart a small lateral displacement to the cutter bit towards the shoulders 3 and 4, which results in a tight engagement between the lateral walls of the cutter bit and the shoulders 3 and 4. This tight fixation is effected at the same time that the lower face of the cutter bit is clamped to the base 2 of the recess 1. The displacement between the axis of opening 6 and that of bore B is shown on an exaggerated scale between B' and 6' in FIG. 2.

When it is desired to loosen the clamping assembly for the cutter bit, the clamping bolt is rotated in the reverse direction, and as soon as the tapered head 14 of the bolt backs off from the tapered wall 22 of the split collet, the resilient sleeve contracts and loosens the bearing between the cylindrical surfaces of the bore B and the collet C, thereby permitting the removal of the cutter bit from its seat so that the cutting edges thereof may be re-positioned, or the cutter bit can be disengaged for substitution by another cutter bit.

The drawings illustrate the invention on a greatly enlarged scale, and in order to portray the invention in its proper structural perspective it may be said that in one practical embodiment of the invention the fastening bolt may have a length of approximately five-eighths inch, with one-half of its length constituting the threaded shank 12. The diameter of the face 13 of the bolt may be 0.190 inch and that of the midportion 15 may be 0.125 inch. The tapered face 14 may extend at an angle of 10° to the vertical. The external diameter of the split collet may be 0.245 inch with the internal diameter at the top thereof being 0.200 inch and the diameter at the narrow neck portion 28 of the collet having a dimension of 0.140 inch. The gap 27 in the cutter is 0.03 inch representing about 5 percent of the circumference, subtending an angle of approximately 18°. Therefore, the collet has a maximum thickness of approximately one-sixteenth inch, which imparts substantial strength thereto without deleteriously affecting its resilience. The split 27 in the collet extends across the complete length thereof and the same may be inclined to the vertical axis thereof if desired. The depth of the hexagonal opening 16 may be 0.100 inch for accommodating a 3/32 inch Allen wrench.

The cutter bit may assume many different configurations other than square as shown, for example triangular, pentagonal, hexagonal, etc. Furthermore, the cutting bit may be rectangular without being square.

I claim:

1. A tool clamping assembly for detachably fastening an indexable cutting bit on a tool holder, comprising
   a. a tool holder having a recessed seat therein for receiving a regular polygonal cutting bit provided with a plurality of cutting edges,
   b. said recessed seat having a base portion and at least one shoulder portion extending upwardly therefrom,
   c. said base portion having a threaded bore at the interior portion thereof extending inwardly of the tool holder,
   d. said indexable cutting bit having a cylindrical opening of larger diameter than said threaded bore, said opening extending between the opposite faces of said bit and centrally of the lateral edges thereof,
   e. a clamping bolt for fastening said cutting bit onto said seat, said bolt having a threaded portion at the one end thereof and an external tapered lateral surface at the opposite end thereof,
   f. a radially expansible sleeve surrounding said tapered lateral surface of said bolt provided with a narrow slot in the lateral wall thereof extending from the opposite ends thereof,
   g. said sleeve having an external substantially cylindrical surface normally fitting closely within said cylindrical opening of said cutting bit, and an internal frusto-conical surface having a conicity corresponding to the tapered lateral surface of said bolt to effect substantially complete surface contact between said internal frusto-conical surface and the tapered lateral surface of said bolt around its entire circumferential area except for the small area adjacent to said narrow slot, and
   h. means at the end of said bolt for imparting rotary movement thereto, whereby the advancing movement of the threaded portion of said bolt into said threaded bore of said tool holder imparts only radial expansive movement to said sleeve to the exclusion of any translational movement thereto, which effects tightly engaging contact between substantially the entire periphery of said tapered lateral surface of said bolt and the correspondingly tapered internal surface of said sleeve as well as between substantially the entire external cylindrical surface of said sleeve and the internal periphery of said cylindrical opening in said indexable cutting bit, whereby a rigid and tight clamping interconnection is effected between said tool holder and cutting bit at both said base portion and shoulder portion of said seat.

2. An assembly as set forth in claim 1, wherein said shoulder portion is comprised of two intersecting surfaces extending upwardly from said base.

3. An assembly as set forth in claim 2, wherein a free gap is provided between the two intersecting surfaces extending upwardly from said base for accommodating a corner of said cutting bit.

4. An assembly as set forth in claim 2, wherein said cutting bit is of rectangular outline and the surfaces of said shoulder portions of said seat are arranged perpendicularly to each other.

5. An assembly as set forth in claim 2, wherein said cutting bit is of square outline and the surfaces of said shoulder portions of said seat are arranged perpendicularly to each other.

6. An assembly as set forth in claim 1, wherein the bottom of said expansible sleeve rests upon the base portion of the seat in said tool holder.

7. An assembly as set forth in claim 1, wherein said last-mentioned means comprises an opening of hexagonal cross-section for accommodating an Allen wrench therein.

8. An assembly as set forth in claim 1, wherein the axis of said threaded bore and that of said cylindrical opening are parallel to each other, with the former being slightly closer than the latter to said shoulder portion.

* * * * *